Jan. 12, 1937.   F. H. JOHNSTON ET AL   2,067,620
WHEEL ASSEMBLY SPREADER
Filed March 23, 1936
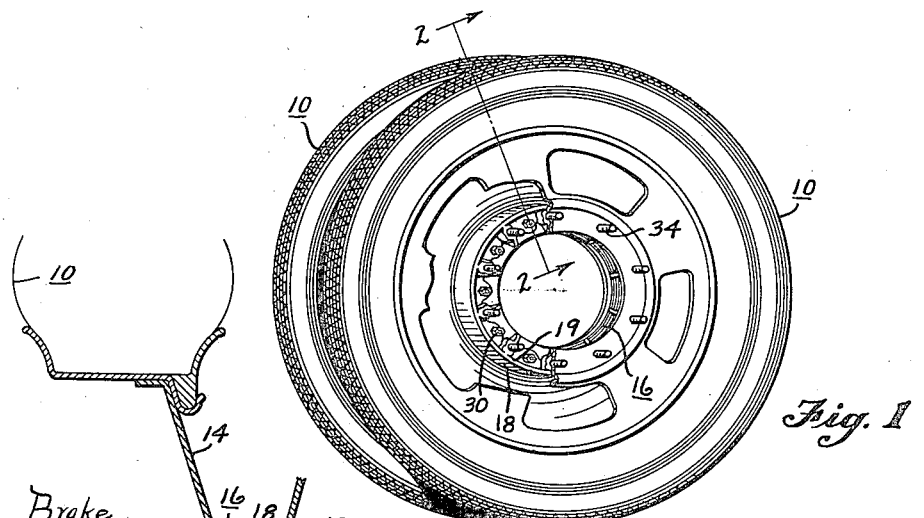
Fig. 1
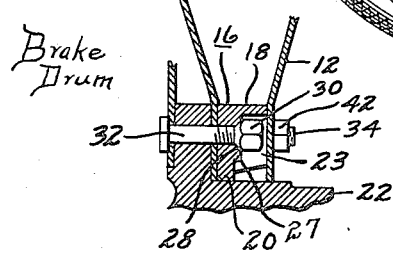
Fig. 2
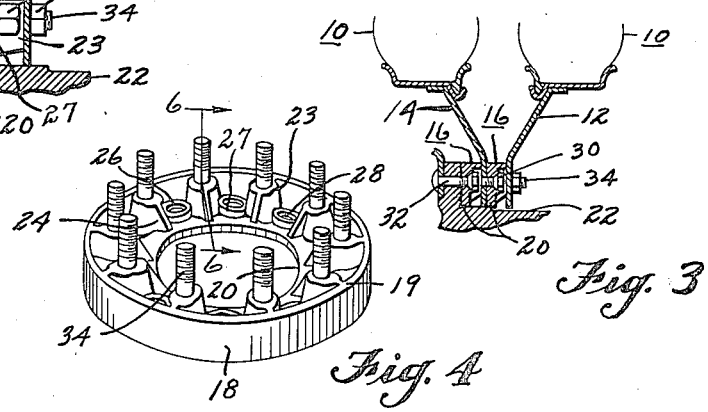
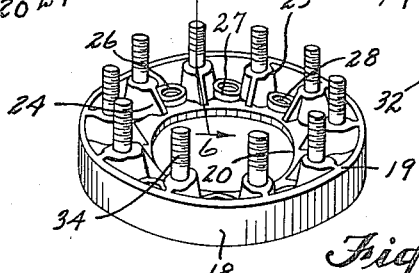
Fig. 3
Fig. 4
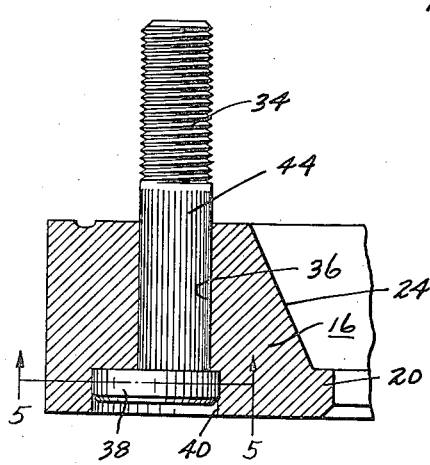
Fig. 6
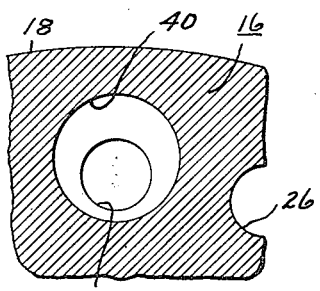
Fig. 5
INVENTORS
Frank H. Johnston
Alvan R. Lambert &
Herbert L. Brump
By Henry G. Dybois
Their ATTORNEY.

Patented Jan. 12, 1937

2,067,620

UNITED STATES PATENT OFFICE 2,067,620

WHEEL ASSEMBLY SPREADER

Frank H. Johnston, Alvan R. Lambert, and Herbert L. Brump, Dayton, Ohio, assignors to Ohio Units, Incorporated, Dayton, Ohio, a corporation of Ohio Application March 23, 1936, Serial No. 70,386

8 Claims. (Cl. 301—36)

This invention relates to wheels for motor vehicles and in more particular to dual wheels and spreaders therefor holding the wheels in fixed spaced relation.

An object of this invention is to provide a spreader that is easily constructed, cheaply manufactured, readily adaptable for various requirements, efficient and at the same time dependable.

Another object of this invention is to provide means for non-rotatably mounting studs in the spreader.

Another object of this invention is to provide bolts having eccentric heads and eccentric recesses therefor, so as to prevent rotation of the bolts when mounting or demounting parts of the wheel assembly.

Another object of this invention is to provide a new process in the manufacture of spreaders that is dependable, easily carried out, resulting in a satisfactory finished product.

Another object of this invention is to provide eccentric recesses for the heads of the bolts, disposed so as to leave the maximum amount of material intact between adjacent holes.

Another object of this invention is to provide a knurled bolt that is driven into position, thereby snugly seated even though fairly large tolerances are permitted in the bore of the hole and in the diameter of the bolt.

Another object of this invention is to provide conical seats adapted to receive conically shaped retaining members for holding the spreader in fixed position, the conical seats cooperating with the conically shaped retaining members to wedge the parts in position.

Other objects and advantages reside in the construction of parts, the combination thereof and the mode of operation, as will become more apparent from the following description.

In the drawing Fig. 1 discloses a perspective view of the wheel assembly of one adaptation, with parts broken away to expose a portion of the spreader mechanism.

Fig. 2 is a fragmentary sectional view taken substantially on the line 2—2 of Fig. 1, to show an adaptation of the spreader.

Fig. 3 is a fragmentary cross sectional view of another adaptation of the spreader, the sectional view being taken in a manner similar to that of Fig. 2.

Fig. 4 is a perspective view of the spreader before assembly.

Fig. 5 is an enlarged sectional view taken substantially on the line 5—5 of Fig. 6, the retaining stud or bolt having been omitted for the sake of clearness.

Fig. 6 is an enlarged sectional view taken substantially on the line 6—6 of Fig. 4.

In the past it has been common practice in the manufacture of spreaders to use studs threaded at both ends, one of which ends has its threads screwed into the spreader. This is satisfactory in some installations; but in others it is not quite as satisfactory as it might be, in that there is a tendency when removing the wheel for the stud to turn with the nut, rather than the nut turning on the stud. Furthermore, there is a tendency of the threads engaging the spreader to strip, so as to permit the stud to loosen and eventually drop out. Needles to state, this creates a hazard both to the vehicle and its owner, as well as the public at large, as the failure of one stud may lead to a failure of the wheel assembly.

In the present embodiment the studs are provided with heads eccentrically mounted that are seated in recesses provided therefor, which recesses are eccentrically disposed with respect to the axis of the hole receiving the bolt, which eccentric relation of the head and its recess prevents the rotation of the bolt when turning the nut. The eccentricity of the head is preferably radially and outwardly disposed with respect to the axis of the hub, so that the material between adjacent holes is left intact as far as possible, thereby leaving a strong structure where the maximum strength is required.

It is essential that there be no play between the spreader and the bolts or studs. This play may be eliminated by accurate workmanship, maintaining the tolerances permissible within fine limits; but such a procedure proves rather expensive, as it is then necessary to add additional steps in the manufacture of the bolts or studs and necessary to ream the holes after the drilling operation.

In the present embodiment the tolerances may be greater as the bolts or studs have been knurled, thereby permitting less accurate fit between the bolts and their holes as the bolts are driven into position, the knurling being partially or entirely embedded in the sides of the holes depending upon the particular dimensions of the holes and the corresponding bolts.

In motor vehicles such as trucks and the like, it is quite often desirable to have two inflated tires, or suitable other tires, side by side. Each tire 10 may be mounted upon separate wheels 12 and 14 which are oppositely disced, as best seen in Figs. 2 and 3, so as to properly space the tires. Ordinarily the inner margins of the discs abut each other, in which event the tires designed by the manufacturer for the particular truck are properly spaced from each other.

A user may wish to use oversize tires, either so as to carry a larger load or secure better traction and a firmer footing. When this is done, the normal spacing of the discs 12 and 14 is insufficient to accommodate the oversize tires. It is then necessary to spread the inner margins of the discs 12 and 14 by a suitable spreader 16. These spreaders may be made in various widths so that a spreader 16 may be selected from a plurality of sizes of spreaders to satisfy the particular need.

In the preferred modification the spreader 16 is provided with an annular portion 18 having an inwardly projecting flange 20 adapted to be seated upon the hub 22 of the wheel. A plurality of bosses 23 project from the flange 20 along the annular portion 18, terminating in a plane flush with the outer surface 19 of the annular portion 18. The bosses 23 are equally disposed circumferentially and equally spaced radially from the axis of the hub. In order to reinforce the bosses 23, reinforcing webs 24 extend from the surface of the bosses diagonally inwardly towards the hub of the wheel, terminating in the flange 20.

Holes 26 are disposed intermediate the bosses, the holes terminating in a conical portion 28, adapted to receive a conical shaped nut 30 threadedly engaging the bolt 32, usually supplied by the manufacturer for holding the two discs 12 and 14 on the wheels in fixed position. When one disc is removed, the spreader 16 is inserted in its place and held in position by the nuts 30 threadedly engaging the bolts 32. The nuts 30 are preferably provided with the conical portion seated in the conical seat 28, so as to wedge the spreader in position, thereby holding it in a fixed and rigid position and at the same time clamping the disc of the wheel 14 in position. The flange 20 may be provided with raised portions 27 that receive the conical surface 28, thereby leaving the flange 20 intact.

The disc 12 of the outer wheel abuts the surface 19 of the annular portion 18 and is held in position by a plurality of bolts 34 seated in apertures 36 extending through the bosses 23. The bolts 34 are provided with round heads 38 eccentrically disposed with respect to the axis of the bolt, so as to be arranged in offset relation. The heads 38 are seated in round holes 40 also eccentrically disposed with respect to the apertures 36, so that as the bolt 34 is driven home, the head 38 is seated in the eccentrically disposed recesses 40, thereby preventing rotation of the bolts 34 when the disc 12 is secured in position by the nuts 42 threadedly engaging the threaded bolts 34. The eccentric recesses 40 have been outwardly disposed with respect to the axis of the hub of the wheel, so as to leave the maximum amount of material intact between adjacent holes, thereby providing maximum strength of the assembly for the amount of material used.

The spreader assembly including the bolts 34 and the eccentric heads 38 is symmetrically arranged with respect to the axis of rotation of the wheel, resulting in a balanced structure.

It is very desirable that the bolts 34 have a close and tight fit with respect to the apertures 36, as any movement between the bolt 34 and its aperture will result in the bolt 34 becoming very loose, which may result in the failure of a spreader or of the disc. Rather than to ream every hole, the bolts 34 have been knurled, as shown at 44, so as to insure a tight fit between the bolt and its hole even though the tolerances may be quite large, the ribs of the knurled bolt being forced into the sides of the material when the bolt is driven home into position.

The invention may also be used in connection with bolts passed through a suitable flange on the hub to hold demountable wheels in position.

Figure 3 discloses another adaptation of the invention. In this disclosure a spreader 16 has been inserted between the flange of the hub and the disc 14 so as to provide a greater clearance between the inner tire 10 and the chassis of the motor vehicle not shown. Another spreader 16 has been inserted between the two discs 12 and 14 to provide sufficient clearance between the tires carried thereby.

The method of production

After the spreader 16 has the surfaces finished which are to be finished, the recesses 40 and the holes 26 may be drilled either in one or more operations from one side of the spreader. After these operations are completed the spreader may be inverted and the holes 36 drilled. At the same time, or in a separate operation, the margins of the holes 26 may be reamed to form the conical seats 28. It is not absolutely essential to drill the holes 36 and the recesses 40 from opposite sides of the spreader; but this is the preferred method.

Although the preferred modification of the device has been described, it will be understood that within the purview of this invention various changes may be made in the form, details, proportion and arrangement of parts which generally stated consist in a device capable of carrying out the objects set forth, in the novel parts, combination of parts and mode of operation as disclosed and defined in the appended claims.

Having thus described our invention, we claim:

1. A spreader assembly unit for use in spacing wheels supporting adjacently disposed tires for motor vehicles, comprising an annular member having an inwardly projecting flange portion surrounding an annular recess adapted to be seated upon the hub of the wheels, said flange portion being provided with a plurality of equally disposed bosses intermediate equally spaced holes receiving retaining members normally adapted to hold at least one of the wheels in position, said bosses being provided with holes terminating in annular eccentrically disposed recesses in the flange portion and a plurality of bolts, one for the hole in each boss, said bolts having eccentrically disposed annular heads normally seated in the annular eccentric recesses thereby preventing rotation of the bolts.

2. In a multiple wheel assembly unit for motor vehicles having two or more tires arranged in close proximity to each other, said unit including a spreader member of a size selected from a plurality of spreader members of various sizes, said spreader member having a series of holes for receiving fastening members normally adapted to hold one of the tire supports in position, said spreader member having a second series of holes in addition to the first series of holes, the second series of holes terminating in annular recesses eccentrically disposed radially and outwardly with respect to the holes, and a plurality of bolts of a size selected from a plurality of sizes, said bolts having eccentrically disposed heads and seated in the eccentric annular recesses preventing rotation of the bolts.

3. In a wheel assembly, a hub, an annular tire carrying member demountably mounted, an annular member supported upon the hub, said annular member having a plurality of equally spaced holes radially disposed with respect to the axis of the hub and parallel thereto, each of said holes terminating in a recess eccentrically disposed with respect to the holes, and a plurality of retaining studs provided with eccentrically disposed heads adapted to be seated in said eccentric recesses to prevent rotation of the studs normally engaging said tire carrying member to hold it in fixed relation with respect to said annular member.

4. In a demountable wheel assembly, an annular member concentrically disposed with respect to the axis of rotation of the wheel, said annular member having a plurality of equally spaced holes radially disposed with respect to said axis, each of said holes terminating in an eccentrically disposed recess symmetrically disposed with respect to said axis of rotation, and retaining members seated in said holes and having eccentric heads positioned for non-rotation in said eccentric recesses.

5. In a wheel assembly, an annular member having a plurality of equally spaced holes radially disposed with respect to the axis of rotation of the wheel, each of said holes terminating in an eccentric recess, a demountable annular member having portions thereof overlying one side of said first mentioned annular member, and retaining means normally seated in said holes and having eccentric heads positioned in the eccentric recesses for retaining said demountable annular member in position, the eccentric heads preventing rotation of the retaining means.

6. In a wheel assembly for motor vehicles, an annular member having a plurality of radially disposed equally spaced holes terminating in annular recesses eccentrically positioned with respect to the axis of the holes, a demountable member having holes registering with the holes of said first annular member and knurled retaining bolts having eccentric heads seated in said recesses for preventing the rotation of the bolts, the knurling of the bolts causing the bolts to snugly fit in position, said bolts holding the first annular member in fixed relation with respect to the demountable member.

7. A spreader assembly for a dual wheel unit adapted to hold the wheels in fixed spaced relation, said spreader assembly including a plurality of radially disposed equally spaced holes terminating in a conical seat adapted to receive bolts provided with conical nuts for holding the spreader member in position with respect to one of the wheels, said spreader member having a second series of radially disposed equally spaced holes terminating in eccentric recesses radially disposed with respect to the axis of rotation of the wheels, and retaining bolts having eccentric heads seated in said recesses for holding the other wheel in fixed relation with respect to the spreader member.

8. In a multiple wheel assembly for supporting a plurality of vehicle tires in close spaced relation, the combination including a tire support for each tire, each of said supports including an inwardly projecting disc shaped member, a spreader member disposed intermediate the disc shaped members and a plurality of series of bolts, one series for holding the spreader member in fixed relation with respect to one of said disc shaped members and another series for holding the spreader member in fixed relation with respect to another of said disc shaped members, the nuts of one series of bolts being enclosed and concealed by said spreader member and the oppositely disposed disc shaped member, the heads of the other series of bolts being enclosed and concealed by said spreader member and another disc shaped member.

FRANK H. JOHNSTON.
ALVAN R. LAMBERT.
HERBERT L. BRUMP.